(12) United States Patent
Gilbert et al.

(10) Patent No.: US 6,911,601 B1
(45) Date of Patent: Jun. 28, 2005

(54) COVER ASSEMBLY FOR AN ELECTRONIC DEVICE ENCLOSURE

(75) Inventors: Mark L. Gilbert, Auburn, CA (US); Jason Soon Peng Sim, Singapore (SG)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/932,724

(22) Filed: Sep. 1, 2004

(51) Int. Cl.$^7$ .................................................. H02G 3/14
(52) U.S. Cl. ......................... 174/66; 174/67; 220/241
(58) Field of Search ............................ 174/66, 67, 50, 174/52.1, 135; 220/241, 242, 3.8

(56) References Cited

U.S. PATENT DOCUMENTS

| | | | | |
|---|---|---|---|---|
| 4,541,538 A | * | 9/1985 | Swetnam | 220/3.8 |
| 4,835,343 A | * | 5/1989 | Graef et al. | 174/66 |
| 5,317,108 A | * | 5/1994 | Prairie, Jr. | 174/67 |
| 6,091,024 A | * | 7/2000 | Korhonen | 174/66 |
| 6,114,625 A | * | 9/2000 | Hughes et al. | 174/52.1 |
| 6,664,472 B2 | * | 12/2003 | Saneto et al. | 174/66 |
| 6,797,883 B2 | * | 9/2004 | Benson et al. | 174/66 |

* cited by examiner

*Primary Examiner*—Dhiru R. Patel (57) ABSTRACT

A cover assembly for covering an opening in an enclosure for an electronic device is described. The cover assembly includes a compliant fastening mechanism that is coupled to a cover and extends through the cover. With the cover in place over the opening, a first portion of the fastening mechanism is inside the enclosure and a second portion is outside the enclosure. The first portion engages with the lip of the opening, and the second portion provides leverage for disengaging the first portion from the lip. The cover can be installed and removed without using a tool.

24 Claims, 6 Drawing Sheets

COVER ASSEMBLY FOR AN ELECTRONIC DEVICE ENCLOSURE

TECHNICAL FIELD

Embodiments of the present invention relate to enclosures for electronic devices, and in particular to covers for openings in such enclosures.

BACKGROUND ART

An electronic device may produce and radiate energy that can disrupt the operation of neighboring electronic devices. This effect is referred to as radio frequency interference (RFI).

Electronic devices are commonly enclosed in a housing or enclosure to prevent energy from radiating to neighboring devices. Typically, the enclosure has one or more openings or ports. The openings can be used to gain access to internal components for installation and maintenance, for example. The openings can also be used to connect accessory devices or add expansion modules, for example. The openings are covered to prevent the release of energy that might disrupt neighboring devices.

There are many different types of covers used in the prior art, but each is problematic in some manner. One type of cover is held in place using one or more screws. A disadvantage of this design is that a relatively large amount of additional space is needed on the surface of the enclosure in order to provide a location to insert the screw(s). In other words, the footprint of the cover extends well beyond the footprint of the opening because space is needed adjacent to the opening to accept the screw(s) that hold the cover in place. Another disadvantage is that a tool such as a screwdriver is needed to install and remove the screw(s). Although larger screws that can be installed by hand may instead be used, these larger screws are relatively expensive and further enlarge the footprint of the cover.

Another type of cover snaps in place to close the opening. A problem with the snap-in cover design is that it may not be tight enough to prevent energy from escaping. Another problem with this design is that it is usable only for a limited number of cycles before wearing out due to fatigue. Furthermore, the cover may pop out of place when the electronic device is being handled or moved or simply due to wear. If the cover is situated out of sight (e.g., on the rear of the enclosure), its absence may not be noticed, allowing energy to escape through the opening and disrupt neighboring devices.

A cover similar in design to the snap-in cover is a molded conductive elastomer cover. However, this design shares the disadvantages of the snap-in cover with the added disadvantage that a tool may be required for removal.

In general, prior art cover designs have one or more of the following disadvantages: they have a footprint that is significantly larger than the footprint of the opening, limiting the density of ports on the enclosure; they require tools for installation and removal; they do not adequately prevent energy from leaking out of the enclosure; they do not stay in place, in particular if the enclosure is subject to shock loads or vibrations; they need to be manufactured to precise manufacturing tolerances; and/or they are usable only for a limited number of cycles before wearing out.

Accordingly, a cover design that addresses these problems would be of value. Embodiments of the present invention provide a cover design that addresses all of these problems.

DISCLOSURE OF THE INVENTION

Embodiments of the present invention pertain to a cover assembly for covering an opening in an enclosure for an electronic device. In one embodiment, the cover assembly includes a compliant fastening mechanism that is coupled to a cover and extends through the cover. With the cover in place over the opening, a first portion of the fastening mechanism is inside the enclosure and a second portion is outside the enclosure. The first portion engages with the lip of the opening, and the second portion provides leverage for disengaging the first portion from the lip. The cover can be installed and removed without using a tool.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale except if specifically noted.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Figure 1:
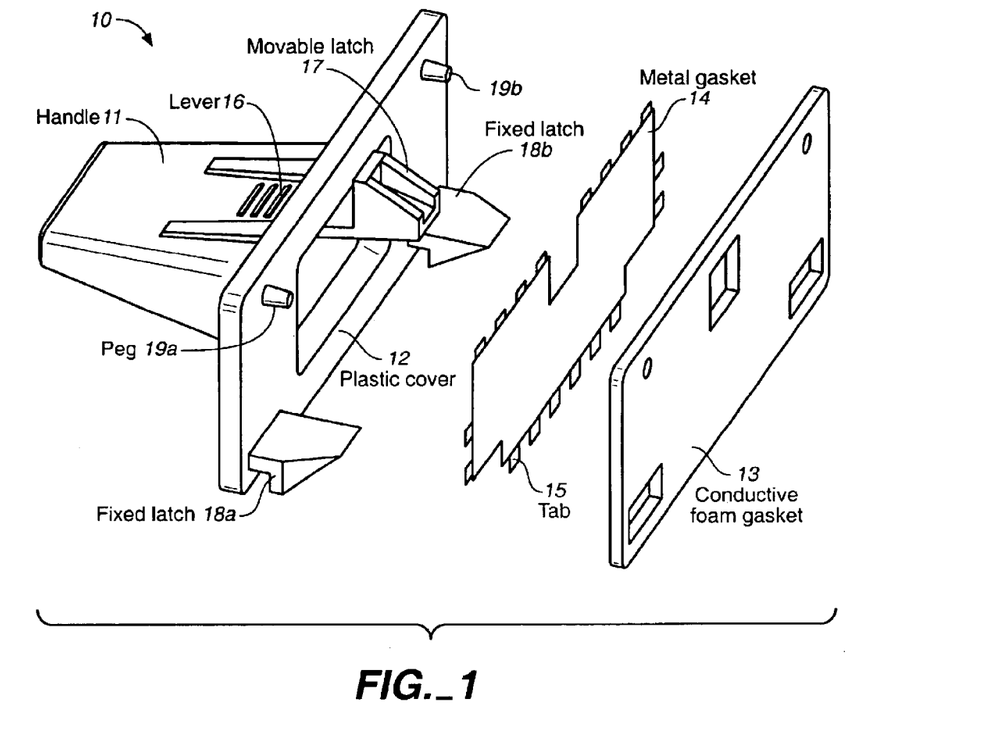
FIG. 1 is a perspective drawing showing one embodiment of a disassembled cover assembly in accordance with the present invention.

FIG. 1 is a perspective drawing showing one embodiment of a disassembled cover assembly 10 in accordance with the present invention. In the discussions herein, terms such as "latch," "peg," "tab" and "lever," are chosen to name elements of cover assembly 10. Each of these elements performs one or more functions that will be described below. While the chosen element names are useful in facilitating the description and understanding of certain features of the present invention, the use of such names is not intended to limit the present invention to specific types of elements, and elements equivalent in function to latches, pegs, tabs, levers, etc., but known by other names may instead be used.

In the embodiment of FIG. 1, cover assembly 10 includes handle 11 attached to cover 12. In one embodiment, handle 11 and cover 12 are molded from plastic.

Although cover 12 is illustrated as being roughly rectangular in shape, the present invention is not so limited. In general, the shape as well as the size of cover 12 is selected according to the shape and size of the opening it is expected to cover. A variety of different shapes, including circular shapes, and sizes can be accommodated.

Also, the size of cover 12 is selected such that it does not extend substantially outside the footprint of the opening. As will be described below, cover 12 is used in combination with a gasket to provide a seal around the edges of the cover to prevent energy from escaping through the opening. Thus, the use of "substantially" in this instance means that cover 12 extends far enough outside of the footprint of the opening to provide a seal around the entire opening considering, for example, manufacturing tolerances that may permit some variability in the positioning of cover 12.

Lever 16 and moveable latch 17 are coupled to cover 12. More specifically, in the present embodiment, lever 16 and moveable latch 17 are coupled to handle 11, which in turn is coupled to cover 12. In general, movement of lever 16 causes moveable latch 17 to move (e.g., if lever 16 is depressed, moveable latch 17 moves downward).

With cover 12 in place over an opening on an enclosure, lever 16 is outside of the enclosure and moveable latch 17 is inside the enclosure. Moveable latch 17 engages with the lip of the opening, and lever 16 is used to disengage moveable latch 17 from the lip. This is described further in conjunction with FIG. 5, below.

Lever 16 and moveable latch 17 constitute what is referred to herein as a "compliant fastening mechanism." Where lever 16 joins with handle 11, there is enough flexibility for lever 16 to move when forced downward, balanced by enough material memory for lever 16 to return to its original position when the downward force is removed, and also balanced by enough rigidity for lever 16 to remain in its original position and hold moveable latch 17 in place against the lip of the opening when the downward force is removed. In one embodiment, lever 16 and moveable latch 17 are molded from plastic.

With reference to FIG. 1, cover 12 also includes fixed latches 18a and 18b and pegs 19a and 19b. In one embodiment, fixed latches 18a and 18b, and pegs 19a and 19b are molded from plastic.

Fixed latches 18a and 18b are also referred to herein as "fastening elements," while pegs 19a and 19b are also referred to herein as "positioning elements." With cover 12 in place over an opening on an enclosure, fixed latches 18a and 18b and pegs 19a and 19b are inside the opening, extending inside the enclosure (see FIG. 5, below). Functions performed by fixed latches 18a and 18b and pegs 19a and 19b are described in the discussions to come.

One function of fixed latches 18a and 18b is to engage the lip of the opening and, in combination with pegs 19a and 19b, help hold cover assembly 10 (specifically, cover 12) in place over the opening, even if the enclosure is subject to shock loads (e.g., the enclosure is dropped) and vibration. The amount of tolerance in the positioning of fixed latches 18a and 18b and pegs 19a and 19b (as well as moveable latch 17) on cover 12 can be offset by the size of cover 12. In other words, the precision in which moveable latch 17, fixed latches 18a and 18b and pegs 19a and 19b are positioned during manufacture of cover 12 is a factor in establishing how accurately cover 12 can be placed over an opening. If moveable latch 17, fixed latches 18a and 18b and pegs 19a and 19b are manufactured with larger tolerances (less precision), then the size of cover 12 can be increased to compensate (a larger cover can be put in place with less accuracy). If fixed latches 18a and 18b and pegs 19a and 19b are manufactured with smaller tolerances (greater precision), then the size of cover 12 can be reduced. As such, fabrication of cover assembly 10 can be performed using only normal manufacturing tolerances.

In one embodiment, a gasket is positioned against cover 12. In one such embodiment, conductive foam gasket 13 is used. In another such embodiment, metal gasket 14 is used.

With cover 12 in place over an opening on an enclosure, conductive foam gasket 13 compresses against the enclosure (specifically, against the surface of the enclosure that surrounds the opening).

Metal gasket 14 includes a number of tabs exemplified by tab 15. The tabs 15 are bent at a slight angle away from the surface of cover 12. With cover 12 in place over an opening on an enclosure, the tabs 15 flatten against the surface of the enclosure surrounding the opening, causing metal gasket 14 to be forced against cover 12.

Accordingly, both conductive foam gasket 13 and metal gasket 14 provide a tight seal between cover 12 and the enclosure so that energy produced by electronic components within the enclosure cannot escape around the edge of the cover.

Figure 2:
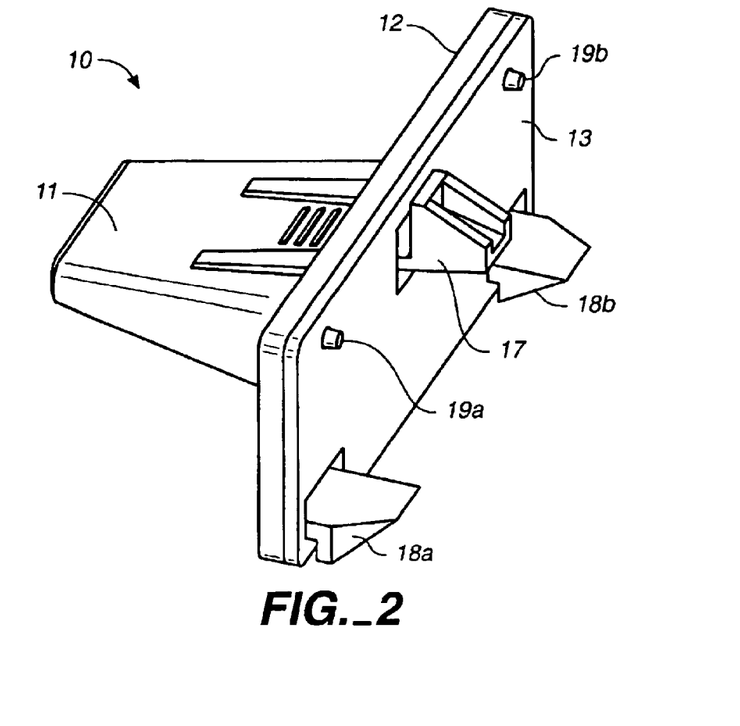
FIG. 2 is a perspective drawing showing one embodiment of an assembled cover assembly in accordance with the present invention.

FIG. 2 is a perspective drawing showing one embodiment of assembled cover assembly 10 in accordance with the present invention. In the example of FIG. 2, conductive foam gasket 13 is shown; however, as mentioned above, metal gasket 14 can instead be used. Openings in the gaskets 13 and 14 allow moveable latch 17, fixed latches 18a and 18b, and pegs 19a and 19b to protrude through the gaskets.

Conductive foam gasket 13 can be attached to cover 12 using some type of adhesive. Metal gasket 14 can be attached to cover 12 using pegs 19a and 19b. For example, metal gasket 14 can be snapped in over pegs 19a and 19b. Other methods of attaching gasket 13 or 14 to cover 12 can be used.

Figure 3:
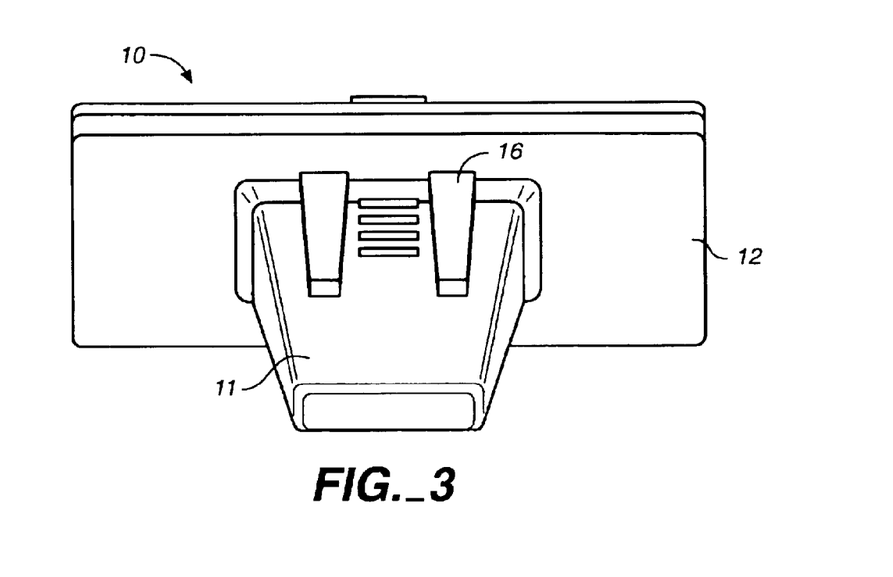
FIG. 3 is a perspective drawing showing the front view of one embodiment of a cover assembly in accordance with the present invention.

FIG. 3 is a perspective drawing showing the front view of one embodiment of cover assembly 10 in accordance with the present invention. With cover 12 in place over an opening on an enclosure, handle 11 and lever 16 are outside of the enclosure, with lever 16 extending through cover 12 into the enclosure.

Figure 4:
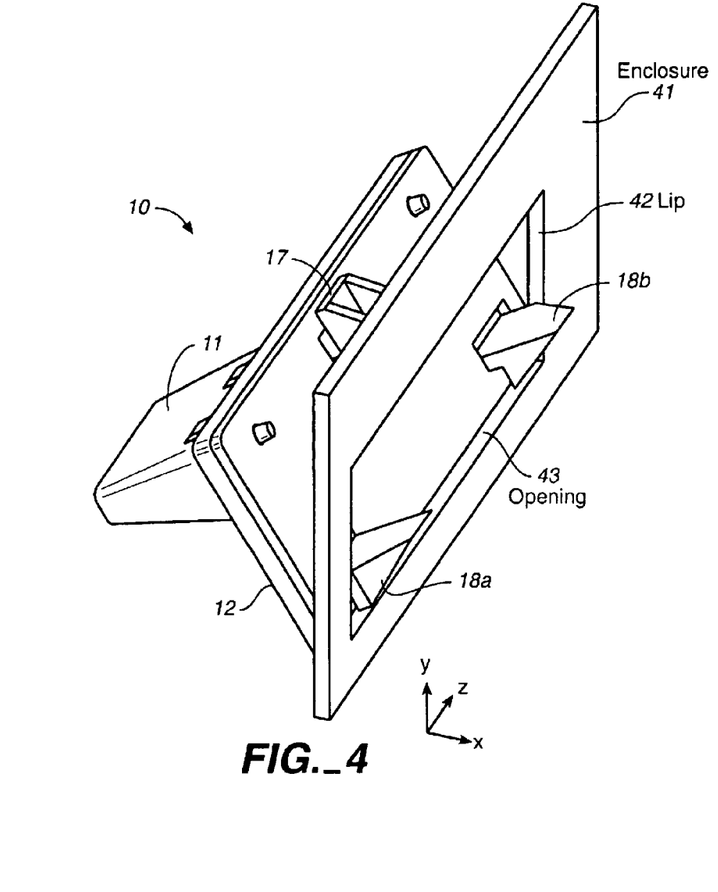
FIG. 4 is a perspective drawing showing one embodiment of a cover assembly as it is inserted into an opening in an enclosure in accordance with the present invention.

FIG. 4 is a perspective drawing showing one embodiment of cover assembly 10 as it is inserted into an opening 43 in an enclosure 41 in accordance with the present invention. Significantly, no tools are needed to install cover assembly 10.

In the example of FIG. 4, cover assembly 10 is held at an angle as it is inserted into opening 43, allowing fixed latches 18a and 18b to engage with the lip 42 of the opening ("lip 42" refers to the edge of the perimeter of opening 43). In one embodiment, the surfaces of fixed latches 18a and 18b that engage with lip 42 (e.g., along the bottom and vertical portions of lip 42, where "bottom" and "vertical" refer to the orientation of FIG. 4) are beveled to facilitate insertion into opening 43.

Once fixed latches 18a and 18b are engaged with lip 42, they can serve as pivots about which cover assembly 10 can be rotated into opening 43. As cover assembly 10 is rotated into opening 43, moveable latch 17 will engage lip 42. In one embodiment, moveable latch 17 is beveled so that, as it comes in contact with lip 42, it is automatically depressed. Alternatively, lever 16 (FIG. 1) can be depressed as cover assembly 10 is inserted into opening 43, in order to allow moveable latch 17 to clear lip 42.

Although FIG. 4 shows cover assembly 10 being inserted in a horizontal position, the present invention is not so limited. Cover assembly 10 can be used in any orientation.

In one embodiment, the distance between fixed latches 18a and 18b corresponds to the width of opening 43 (here, "width" refers to the dimension in the z-direction of FIG. 4). In other words, in one embodiment, fixed latches 18a and 18b are spaced close enough to the edges of cover 12 so that they are adjacent to or abut the sides of opening 43 (here, "sides" refer to the edges of opening 43 in the y-direction of FIG. 4). This spacing facilitates the insertion of cover assembly 10 into opening 43. In essence, fixed latches 18a and 18b guide the positioning of cover assembly 10 into and over opening 43.

Figure 5:
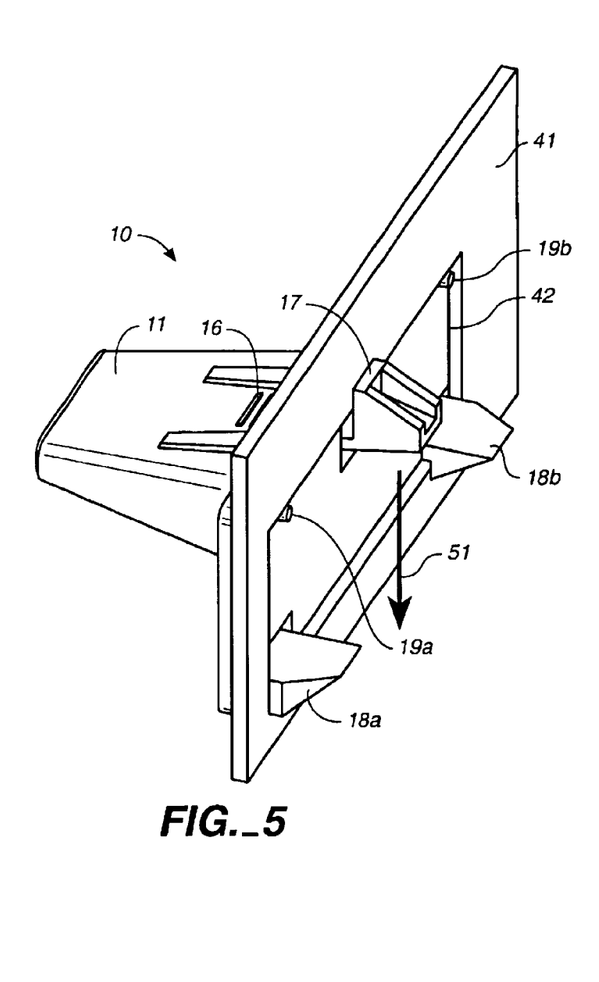
FIG. 5 is a perspective drawing showing one embodiment of a cover assembly in place over an opening in accordance with the present invention.

FIG. 5 is a perspective drawing showing one embodiment of cover assembly 10 installed in enclosure 41 in accordance with the present invention. Enclosure 41 can be any type of enclosure (e.g., housing), such as that used for networking devices (e.g., hubs, routers, switches, etc.), computer systems, or consumer electronic devices (e.g., digital video disk players, video cassette players, etc.). Enclosure 41 does not have to be made of the same material as cover assembly 10.

Moveable latch 17 is engaged with the upper portion of lip 42, and fixed latches 18a and 18b are engaged with the lower portion lip 42 (here, "upper" and "lower" are used in the context of the orientation of FIG. 5). Fixed latches 18a and 18b are adjacent to or abut the horizontal portions of lip 42 (here, "horizontal" refers to the orientation of FIG. 5). Pegs 19a and 19b are adjacent to or abut lip 42.

Importantly, the combination of moveable latch 17, fixed latches 18a and 18b, and pegs 19a and 19b prevent cover assembly 10 from rotating or otherwise moving in any direction if it is subjected to shock loading (e.g., a sudden load) and/or vibration (e.g., sustained, perhaps random, loads that are typically smaller than shock loads) after the cover assembly is installed in enclosure 41. For instance, if enclosure 41 of FIG. 5 is dropped and lands in any orientation, the shock loading applied to cover assembly 10 will not dislodge the cover assembly from the installed position. Some movement of cover assembly 10 is permitted depending on the degree to which cover 12 extends beyond the footprint of opening 43.

To remove cover assembly 10 from enclosure 41, lever 16 is depressed, causing moveable latch 17 to move in the direction of arrow 51 (e.g., downward). Cover assembly 10 can then be rotated out of enclosure 41, using handle 11 to provide any needed leverage. Thus, no tools are needed to remove cover assembly 10 from enclosure 41.

Figure 6:
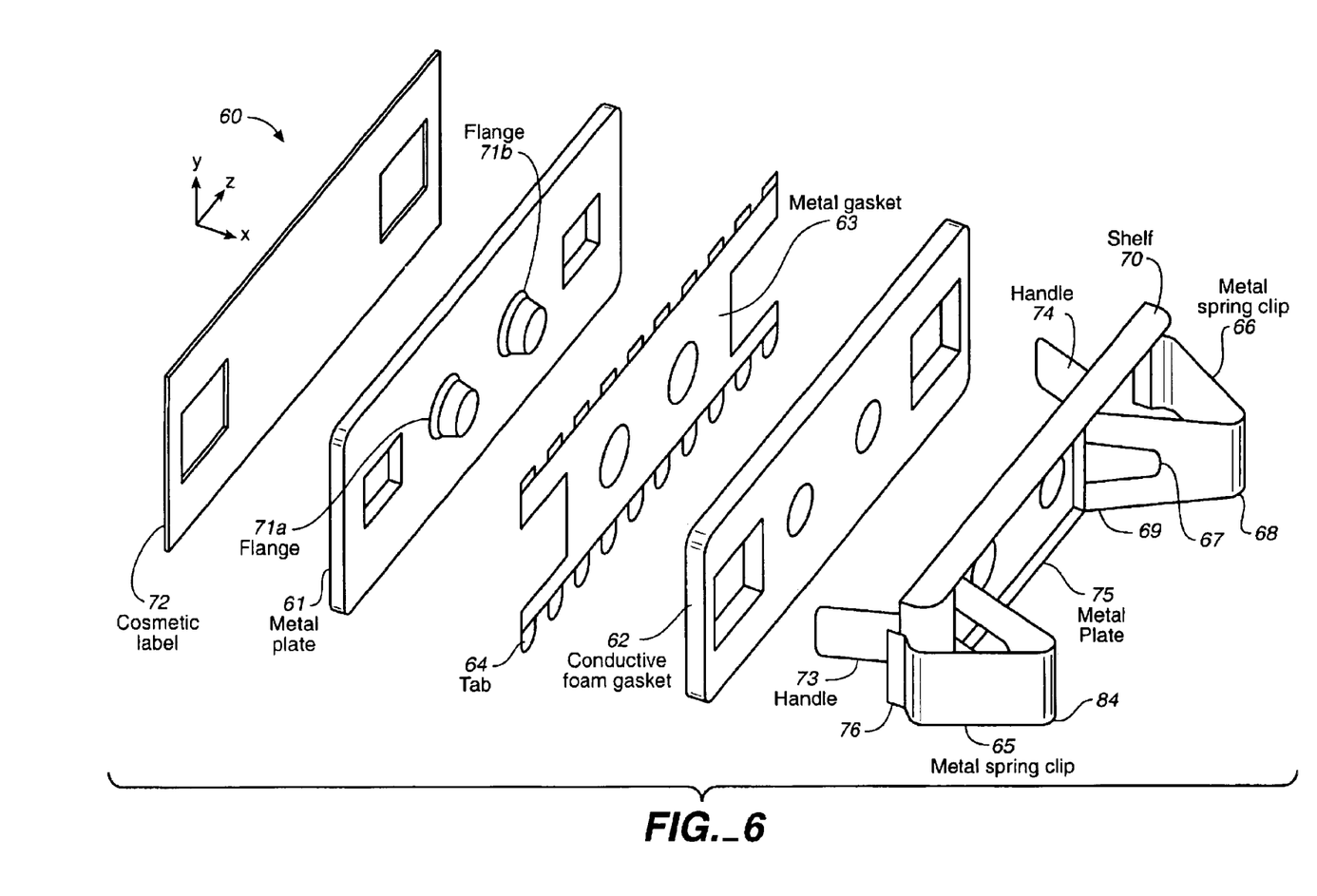
FIG. 6 is a perspective drawing showing a second embodiment of a disassembled cover assembly in accordance with the present invention.

FIG. 6 is a perspective drawing showing one embodiment of a disassembled cover assembly 60 in accordance with the present invention. Unless otherwise mentioned, cover assembly 60 shares the capabilities of cover assembly 10 of FIG. 1. That is, for example, cover assembly 60 can be used to cover openings of various shapes, sizes and orientations in various types of enclosures. The size of the cover assembly (specifically, the size of metal plate 61) is selected so that it does not extend substantially outside of the opening it is expected to cover. Also, although certain names are chosen for the elements of cover assembly 60, the present invention is not so limited.

In the embodiment of FIG. 6, cover assembly 60 includes metal plate 61, a gasket (e.g., conductive foam gasket 62 or metal gasket 63), and metal spring clips 65 and 66. In one embodiment, the metal spring clips 65 and 66 are coupled to metal plate 75 to form a single unit that is in turn coupled to metal plate 61; however, the present invention is not so limited. For instance, metal spring clips 65 and 66 can exist as separate elements that are individually coupled to metal plate 61.

In the embodiment of FIG. 6, one end of metal spring clip 65 is coupled to metal plate 75 while the other end extends through metal plate 75, forming a handle 73. Similarly, one end of metal spring clip 66 is coupled to metal plate 75 while the other end extends through metal plate 75, forming a handle 74. Viewed from above in the orientation of FIG. 6, metal spring clip 65 gradually widens in shape from its "tip" 84, but narrows again at least on one of its sides, at its base 76. The narrower portion at the base 76 allows spring clip 65 to engage with the lip of the opening in an enclosure. Metal spring clip 66 is similarly shaped. In one embodiment, bends or notches for gripping the lip of the opening are formed in the metal spring clips 65 and 66 at their respective bases.

In one embodiment, to assemble cover assembly 60, metal plate 75 is aligned with flanges 71a and 71b formed in metal plate 61. Conductive foam gasket 62 or metal gasket 63 is interposed (sandwiched) between metal plate 61 and metal plate 75 (including metal spring clips 65 and 66). The flanges 71a and 71b can then be deformed to attach the metal plates 61 and 75 to each other, similar to a rivet. Other mechanisms for attaching the metal plates 61 and 75 to each other can be used. The gasket 62 or 63 is held in place by the joining of metal plates 61 and 75, although other techniques for securing gasket 62 or 63 can be used. In one embodiment, a cosmetic label 72 is applied to metal plate 61.

When cover assembly 60 is installed over an opening, conductive foam gasket 62 compresses against the enclosure (specifically, against the surface of the enclosure surrounding the opening).

Metal gasket 63 includes a number of tabs exemplified by tab 64. The tabs 64 are bent at a slight angle away from the surface of metal plate 61. With cover assembly 60 in place over an opening on an enclosure, the tabs 64 flatten against the surface of the enclosure surrounding the opening, causing metal gasket 63 to be forced against metal plate 61.

Accordingly, both conductive foam gasket 62 and metal gasket 63 provide a tight seal between metal plate 61 and the enclosure so that energy produced by electronic components within the enclosure cannot escape around the edge of cover assembly 60.

When assembled, handles 73 and 74 extend through openings in the gasket 62 or 63 and in metal plate 61. With cover assembly 60 in place over an opening on an enclosure, metal spring clips 65 and 66 extend inside the enclosure and engage the lip of the opening, while handles 73 and 74 extend outside the enclosure. Movement of handles 73 and 74 causes metal spring clips 65 and 66, respectively, to disengage from the lip. More specifically, in the example of FIG. 6, moving handle 73 toward the center of cover assembly 60 causes metal spring clip 65 to disengage from the lip. Similarly, moving handle 74 toward the center of cover assembly 60 causes metal spring clip 66 to disengage from the lip. This is described further in conjunction with FIG. 10, below.

Metal spring clips 65 and 66 and handles 73 and 74, respectively, constitute what are referred to herein as "compliant fastening mechanisms." Metal spring clips 65 and 66 are flexible enough so that they can deform when being pressed into an opening on an enclosure, balanced with enough material memory to return to their regular shape after passing through the opening and also balanced by enough rigidity to remain engaged with the lip of the opening after they are installed.

In the example of FIG. 6, metal spring clip 66 of FIG. 6 includes a void 67. The void 67 reduces the stiffness of metal spring clip 66, making it more flexible and also causing the metal spring clip to flex more uniformly along its entire length when compressed. Metal spring clip 65 is similarly configured. However, metal spring clips 65 and 66 can be made without such a void.

Also, in one embodiment, metal spring clip 66 is shaped so that it includes a sloped portion 68 and a relatively linear or flat portion 69. Metal spring clip 65 is similarly shaped. The sloped portion 68 facilitates insertion of cover assembly 60 into an opening in an enclosure in the y-direction of FIG. 6. That is, in the orientation of FIG. 6, the sloped portion 68 helps guide cover assembly 60 over the lower edge of the opening and into the opening. The flat portion 69 helps to hold cover assembly 60 in place during shock loading and vibration. These features are discussed further, below.

Furthermore, in one embodiment, a "shelf" 70 is formed on metal plate 75. Alternatively, shelf 70 can be located on metal plate 61. Also, shelf 70 does not necessarily have to extend the entire length of metal plate 75 or 61 (e.g., a portion of the shelf between its ends need not be present).

The shelf 70 is also referred to herein as a "positioning element." Shelf 70 helps to hold cover assembly 60 in place during shock loading and vibration. In combination with metal spring clips 65 and 66 (specifically, the flat portion 69 of those spring clips), the cover assembly 60 is prevented from rotating or otherwise moving in any direction if it is subjected to shock loading and/or vibration after the cover assembly is installed in an enclosure.

Figure 7:
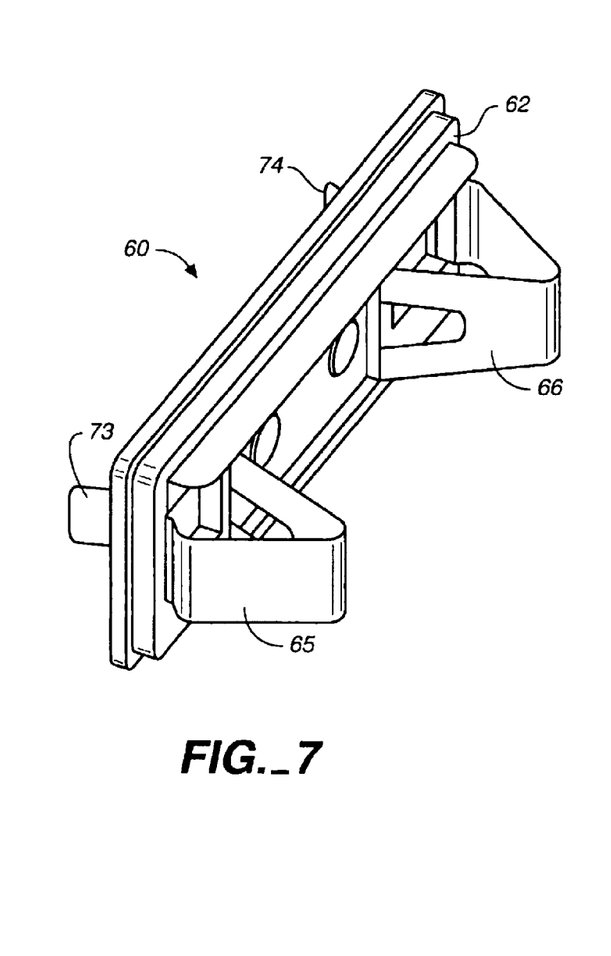
FIG. 7 is a perspective drawing showing a second embodiment of an assembled cover assembly in accordance with the present invention.

FIG. 7 is a perspective drawing showing assembled cover assembly 60 in accordance with one embodiment of the present invention. In the example of FIG. 7, conductive foam gasket 62 is shown; however, as mentioned above, metal gasket 63 can instead be used.

Figure 8:
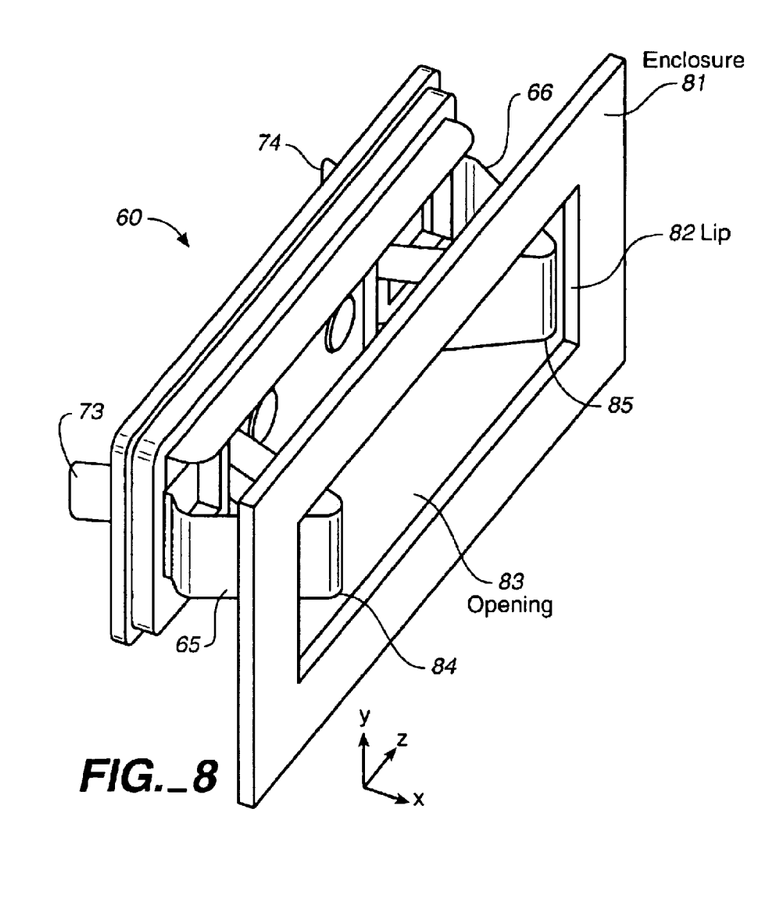
FIG. 8 is a perspective drawing showing a second embodiment of a cover assembly as it is inserted into an opening in an enclosure in accordance with the present invention.

FIG. 8 is a perspective drawing showing one embodiment of cover assembly 60 as it is inserted into an opening 83 in an enclosure 81 in accordance with the present invention. Significantly, no tools are needed to install cover assembly 60.

In the example of FIG. 8, cover assembly 60 is essentially pushed directly into opening 83. As mentioned above, the lower surfaces of the metal spring clips 65 and 66 are sloped to facilitate insertion into opening 83 (here, "lower" refers to the orientation of FIG. 8).

The distance between metal spring clips 65 and 66 is such that the spring clips engage with the sides of lip 82 (here, "side" refers to the edges of opening 83 in the z-direction of FIG. 8; that is, the vertical portions of opening 83 considering the orientation of FIG. 8). Specifically, as the "tips" 84 and 85 of metal spring clips 65 and 66, respectively, are inserted further into opening 83, lip 82 forces the spring clips more and more inward toward the middle of opening 83. As described in conjunction with FIG. 6, the bases of the metal spring clips 65 and 66 are narrower than the widest parts of the spring clips. Accordingly, once cover assembly 60 is inserted fully into opening 83, the metal spring clips 65 and 66 can rebound slightly in the outward direction (away from the middle of opening 83) and engage lip 82 at their bases.

Figure 9:
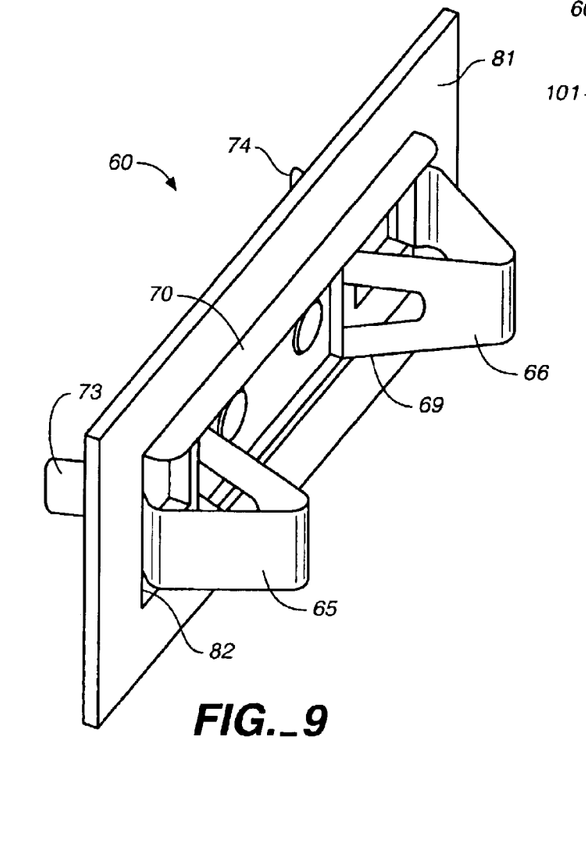
FIG. 9 is a perspective drawing showing a second embodiment of a cover assembly in place over an opening in accordance with the present invention.

FIG. 9 is a perspective drawing showing one embodiment of cover assembly 60 installed in enclosure 81 in accordance with the present invention. Metal spring clips 65 and 66 are engaged with lip 82. Handles 73 and 74 extend from the metal spring clips 65 and 66, respectively, to outside of enclosure 81.

Importantly, the combination of shelf 70 and the metal spring clips 65 and 66 (specifically, the flat portion 69 of metal spring clip 66 and a corresponding flat portion on metal spring clip 65) prevent cover assembly 60 from rotating or otherwise moving during shock loading and/or vibration.

Figure 10:
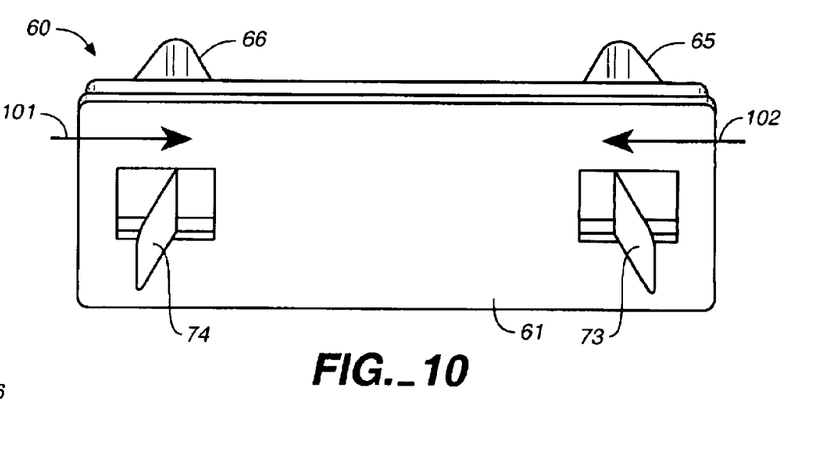
FIG. 10 is a perspective drawing showing the front view of a second embodiment of a cover assembly in accordance with the present invention.

FIG. 10 is a perspective drawing showing the front view one embodiment of cover assembly 60 in accordance with the present invention. With cover assembly 60 in place over an opening on an enclosure, handles 73 and 74 are outside of the enclosure, while metal spring clips 65 and 66 extend into the enclosure. In the example of FIG. 10, metal plate 61 is exposed; however, as mentioned above, a cosmetic label 72 can be applied to metal plate 61.

In one embodiment, to remove cover assembly 60 from the enclosure, handles 73 and 74 are moved inward (e.g., squeezed in the directions of arrows 102 and 101, respectively), causing metal spring clips 65 and 66, respectively, to disengage from the lip of the opening. Cover assembly 60 can then be pulled directly out of the enclosure. Thus, no tools are needed to remove cover assembly 60 from the enclosure.

Figure 11:
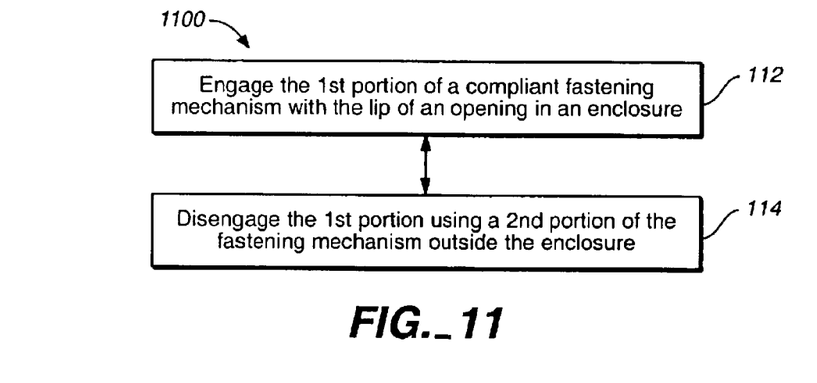
FIG. 11 is a flowchart of a method for covering and uncovering an opening in an enclosure according to one embodiment of the present invention.

FIG. 11 is a flowchart 1100 of a method for covering and uncovering an opening in an enclosure according to one embodiment of the present invention. Although specific steps are disclosed in flowchart 1100, such steps are exemplary. That is, embodiments of the present invention are well-suited to performing various other steps or variations of the steps recited in flowchart 1100. It is appreciated that the steps in flowchart 1100 may be performed in an order different than presented, and that not all of the steps in flowchart 1100 may be performed.

In step 112, in one embodiment, a first portion (e.g., moveable latch 17 or metal spring clip 65 of FIGS. 1 and 6, respectively) of a compliant fastening mechanism is engaged with the lip of the opening.

In another embodiment, a first portion (e.g., metal spring clip 66 of FIG. 6) of a second compliant fastening mechanism is engaged with the lip of the opening.

In step 114 of FIG. 11, in one embodiment, the first portion of the compliant fastening mechanism is disengaged from the lip by moving a second portion (e.g., lever 16 or handle 73 of FIGS. 1 and 6, respectively) of the compliant fastening mechanism.

In another embodiment, the first portion of the second compliant fastening mechanism is disengaged from the lip by moving a second portion (e.g., handle 74 of FIG. 6) of the second compliant fastening mechanism.

In summary, cover assembly embodiments in accordance with the present invention have footprints that are not significantly larger than the footprint of the opening being covered, so that the density of ports on enclosures can be increased. Also, according to embodiments of the present invention, tools are not required for installation and removal. In addition, embodiments in accordance with the invention prevent energy from leaking out of the enclosure, so that RFI is not an issue. Furthermore, cover assembly embodiments in accordance with the present invention are not dislodged if the enclosure is subject to shock loads or vibrations. Moreover, cover assembly embodiments in accordance with the present invention are reusable. Finally, fabrication of cover assemblies in accordance with embodiments of the present invention require only normal manufacturing tolerances.

Embodiments of the present invention are thus described. While the present invention has been described in particular embodiments, it should be appreciated that the present invention should not be construed as limited by such embodiments, but rather construed according to the following claims.

What is claimed is:

1. A cover assembly for covering an opening in an enclosure for an electronic device, said cover assembly comprising:
    a cover; and
    a first compliant fastening mechanism coupled to said cover and extending through said cover, wherein with said cover in place over said opening said first compliant fastening mechanism comprises a first portion that is inside said enclosure and a second portion that is outside said enclosure, and wherein said first portion engages with a lip of said opening and said second portion provides leverage for disengaging said first portion from said lip, wherein said cover is installed and removed without using a tool.

2. The cover assembly of claim 1 further comprising a first fastening element and a second fastening element coupled to said cover, wherein said first and second fastening elements engage said lip of said opening with said cover in place over said opening.

3. The cover assembly of claim 2 further comprising a first positioning element and a second positioning element coupled to said cover, wherein said first compliant fastening mechanism, said first and second fastening elements and said first and second positioning elements in combination oppose movement of said cover in any direction with said cover in place over said opening.

4. The cover assembly of claim 2 wherein said cover and said first compliant fastening mechanism are molded from plastic.

5. The cover assembly of claim 1 further comprising a second first compliant fastening mechanism coupled to said cover and extending through said cover.

6. The cover assembly of claim 5 further comprising a positioning element, wherein said first and second compliant fastening mechanisms and said positioning element in combination oppose movement of said cover in any direction with said cover in place over said opening.

7. The cover assembly of claim 5 wherein said cover and said first and second compliant fastening mechanisms are metallic.

8. The cover assembly of claim 1 wherein said first compliant fastening mechanism is caused to deflect as it is inserted into said opening.

9. The cover assembly of claim 1 further comprising a conductive gasket that is positioned beneath said cover and over said opening with said cover in place over said opening.

10. An enclosure for an electronic device, said enclosure comprising:
    a housing;
    an opening in said housing; and
    a cover over said opening and held in place by a first compliant fastening mechanism coupled to said cover and extending through said cover, wherein a first portion of said first compliant fastening mechanism inside said housing engages with a lip of said opening and a second portion of said first compliant fastening mechanism outside said housing provides leverage for disengaging said first portion from said lip.

11. The enclosure of claim 10 wherein said cover is installed and removed without using a tool.

12. The enclosure of claim 10 wherein said cover comprises a first fastening element and a second fastening element that engage said lip of said opening.

13. The enclosure of claim 12 wherein said cover further comprises a first positioning element and a second positioning element, wherein said first compliant fastening mechanism, said first and second fastening elements and said first and second positioning elements in combination oppose movement of said cover in any direction.

14. The enclosure of claim 12 wherein said cover and said first compliant fastening mechanism are molded from plastic.

15. The enclosure of claim 12 wherein said cover is held in place also by a second compliant fastening mechanism coupled to said cover and extending through said cover.

16. The enclosure of claim 15 further comprising a positioning element coupled to said cover, wherein said first and second compliant fastening mechanisms and said positioning element in combination oppose movement of said cover in any direction.

17. The enclosure of claim 15 wherein said cover and said first and second compliant fastening mechanisms are metallic.

18. The enclosure of claim 10 further comprising a conductive gasket that is positioned beneath said cover and over said opening.

19. A method of closing and opening an access hole in an enclosure using a cover, said method comprising:

engaging a first portion of a first compliant fastening mechanism with a lip of said access hole, wherein said first portion is inside said enclosure and wherein upon said engaging said cover is held in place over said access hole; and disengaging said first portion of said first compliant fastening mechanism from said lip by moving a second portion of said first compliant fastening mechanism, wherein said second portion extends from said first portion through said cover to outside said enclosure and wherein upon said disengaging said cover is moveable from its position over said access hole.

20. The method of claim 19 wherein said cover comprises a first fastening element and a second fastening element, wherein said first and second fastening elements engage said lip of said access hole with said cover in place over said access hole.

21. The method of claim 20 wherein said cover further comprises a first positioning element and a second positioning element, wherein said first compliant fastening mechanism, said first and second fastening elements and said first and second positioning elements in combination oppose movement of said cover in any direction with said cover in place over said access hole.

22. The method of claim 19 further comprising:

engaging a first portion of a second compliant fastening mechanism with said lip of said access hole, wherein said first portion of said second compliant fastening mechanism is inside said enclosure; and disengaging said first portion of said second compliant fastening mechanism from said lip by moving a second portion of said second compliant fastening mechanism that extends from inside said enclosure to outside said enclosure.

23. The method of claim 22 wherein said cover further comprises a positioning element, wherein said first and second compliant fastening mechanisms and said positioning element in combination oppose movement of said cover in any direction with said cover in place over said opening.

24. The method of claim 19 wherein said cover is installed in place and removed without using a tool.

* * * * *